(12) United States Patent
Basar (10) Patent No.: US 8,464,575 B2
(45) Date of Patent: Jun. 18, 2013

(54) DEVICE AND METHOD FOR MEASURING THE GEOMETRY OF A WORKPIECE

(75) Inventor: Ivan Basar, Gerlingen (DE)

(73) Assignee: Marposs GmbH, Weinstadt (DE)

( * ) Notice: Subject to any disclaimer, the term of this patent is extended or adjusted under 35 U.S.C. 154(b) by 296 days.

(21) Appl. No.: 12/842,381

(22) Filed: Jul. 23, 2010

(65) Prior Publication Data

US 2010/0288016 A1    Nov. 18, 2010

(30) Foreign Application Priority Data

Jan. 25, 2008   (DE) .......................... 10 2008 007 593
Jan. 23, 2009   (WO) ................. PCT/EP2009/050791

(51) Int. Cl.
*G01B 13/08*   (2006.01)

(52) U.S. Cl.
USPC .......................................................... 73/37.5

(58) Field of Classification Search
USPC ............ 73/37.5, 37.9, 861.61, 861.62, 29.01, 73/29.02
See application file for complete search history.

(56) References Cited

U.S. PATENT DOCUMENTS

| | | | | | |
|---|---|---|---|---|---|
| 4,195,446 | A | * | 4/1980 | Angst | 451/253 |
| 4,550,592 | A | * | 11/1985 | Dechape | 73/37.5 |
| 5,212,980 | A | * | 5/1993 | Wegmann | 73/37.9 |
| 6,324,845 | B1 | * | 12/2001 | Fulks et al. | 60/582 |
| 7,234,216 | B2 | | 6/2007 | Kuhn et al. | |
| 2003/0079525 | A1 | * | 5/2003 | Halbinger et al. | 73/37 |
| 2003/0219322 | A1 | * | 11/2003 | Zankl et al. | 409/38 |
| 2005/0160571 | A1 | | 7/2005 | Kuhn et al. | |
| 2006/0246966 | A1 | * | 11/2006 | Smith | 460/112 |

FOREIGN PATENT DOCUMENTS

| | | |
|---|---|---|
| DE | 4407159 | 9/1995 |
| DE | 10236402 | 2/2004 |
| EP | 1537946 | 6/2005 |

OTHER PUBLICATIONS

English Machine Translation of Duetsch et al. DE 102 36 402 A1, dated Feb. 26, 2004, translated Jun. 2012.*
English Machine Translation of Basar DE 4407159, dated Mar. 4, 1994, translated Jun. 2012.*
English translation of Written Opinion, dated Mar. 16, 2009, issued in priority International Application No. PCT/ EP2009/050791.
International Search Report dated Mar. 5, 2009.

* cited by examiner

*Primary Examiner* — John Fitzgerald
*Assistant Examiner* — David Z Huang
(74) *Attorney, Agent, or Firm* — Saul Ewing LLP (57) ABSTRACT

In order to improve a device for measuring the geometry of a workpiece in such a way that the geometrical measurements are particularly precise wherein the device comprises a housing having a flow channel in which there is arranged a reference nozzle for the passage of a test fluid therethrough and a first pressure measuring device for measuring a first pressure of the test fluid upstream of the reference nozzle and also a second pressure measuring device for measuring a second pressure of the test fluid downstream of the reference nozzle, it is proposed that the device should comprise a differential pressure measuring device for measuring the differential pressure of the test fluid across the reference nozzle.

7 Claims, 5 Drawing Sheets

DEVICE AND METHOD FOR MEASURING THE GEOMETRY OF A WORKPIECE

CROSS-REFERENCE TO RELATED APPLICATIONS

This application is a continuation under 35 U.S.C. §365 of international application number PCT/EP2009/050791, filed on Jan. 23, 2009, which claims priority to German application number 10 2008 007 593.0, filed Jan. 25, 2008. The contents of both applications are incorporated by reference herein in their entirety and for all purposes.

FIELD OF THE INVENTION

The present invention relates to a device for measuring the geometry of a workpiece generally, and more specifically to a device for measuring the geometry of a workpiece comprising a housing having a flow channel in which there is arranged a reference nozzle for the passage of a test fluid therethrough, a first pressure measuring device for measuring a first pressure of the test fluid upstream of the reference nozzle and a second pressure measuring device for measuring a second pressure of the test fluid downstream of the reference nozzle.

Furthermore, the invention relates to a method for measuring the geometry of a workpiece generally, and more specifically to a method for measuring the geometry of a workpiece wherein a test fluid is arranged to flow through a reference nozzle located in a flow channel in a housing, wherein a first pressure of the test fluid is measured upstream of the reference nozzle and wherein a second pressure of the test fluid is measured downstream of the reference nozzle.

BACKGROUND OF THE INVENTION

Such a device is known from DE 102 36 402 A1.

Devices of this type are used for measuring an internal or an external diameter of a workpiece for example. Here, a test fluid is supplied to a flow channel. The test fluid flows through the flow channel in the direction of flow of the test fluid. The test fluid is subjected to a first test fluid pressure, whereafter it flows through a reference nozzle arranged in the flow channel and is then supplied to a measurement nozzle which is connected in fluidic manner to the flow channel. The test fluid flows out from the measurement nozzle into a gap between the measurement nozzle and the workpiece being measured which serves as a flow restrictor. The magnitude of the gap, which is dependent on the geometry of the workpiece, affects the throttling effect produced by the gap and thus has an effect on the second pressure of the test fluid present between the reference nozzle and the measurement nozzle downstream of the reference nozzle. In this way, the geometry of the workpiece can be determined from a measurement of the first pressure of the test fluid and the second pressure of the test fluid.

When there are a large number of workpieces, in the case of parts of injection pumps or machine tools for example, it is necessary for the dimensions of the workpieces to be produced to the finest of tolerances and to check as to whether these workpiece dimensions are being maintained.

Based on this background, it would be desirable to provide a device of the type mentioned hereinabove which will enable particularly precise geometrical measurements to be made. Moreover, it would be desirable to provide a method for measuring the geometry of a workpiece which is particularly precise.

SUMMARY OF THE INVENTION

In a first aspect of the invention, a device for measuring the geometry of a workpiece comprises a housing having a flow channel in which there is arranged a reference nozzle for the passage of a test fluid therethrough. The device for measuring the geometry of a workpiece further comprises a first pressure measuring device for measuring a first pressure of the test fluid upstream of the reference nozzle and a second pressure measuring device for measuring a second pressure of the test fluid downstream of the reference nozzle. Moreover, the device for measuring the geometry of a workpiece also comprises a differential pressure measuring device for measuring the differential pressure of the test fluid across the reference nozzle.

In a second aspect of the invention, a method for measuring the geometry of a workpiece is proposed, wherein a test fluid is arranged to flow through a reference nozzle located in a flow channel of a housing. A first pressure of the test fluid is measured upstream of the reference nozzle and a second pressure of the test fluid is measured downstream of the reference nozzle. In addition to the first pressure of the test fluid and the second pressure of the test fluid, the differential pressure of the test fluid across the reference nozzle is measured and/or in that the moisture content of the test fluid is measured.

BRIEF DESCRIPTION OF THE DRAWING FIGURES

The foregoing summary and the following description may be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a device for measuring the geometry of a workpiece comprising a housing having a flow channel in which there is arranged a reference nozzle for the passage of a test fluid therethrough, a first pressure measuring device for measuring a first pressure of the test fluid upstream of the reference nozzle and a second pressure measuring device for measuring a second pressure of the test fluid downstream of the reference nozzle, characterized by a differential pressure measuring device for measuring the differential pressure of the test fluid across the reference nozzle.

The first pressure measuring device and the second pressure measuring device can be configured in the form of a first pressure sensor and a second pressure sensor for example. These pressure measuring device respectively measure a first pressure measurement value occurring before the reference nozzle as seen in the direction of flow of the test fluid and a second pressure measurement value occurring beyond the reference nozzle as seen in the direction of flow of the test fluid. These pressure measurement values can be absolute pressures or relative pressures, for example, relative to the ambient pressure of the device.

Now the differential pressure measuring device provided in addition to the first pressure measuring device and the second pressure measuring device enables the differential pressure of the test fluid across the reference nozzle to be measured directly. Consequently, in addition to the measuring signal from the first pressure measuring device and the measuring signal from the second pressure measuring device, a third measuring signal in the form of a third pressure measurement value has now been made available and this can be drawn upon for the purposes of determining a dimension of a workpiece. Each of this total of at least three pressure measuring device produces a measuring signal which is subject to measuring inaccuracy and consequently does not always accurately correspond mathematically to the actual pressure value. With the help of the third measuring signal however, it is now possible to compensate these inaccuracies in the measurements by drawing on all three measuring signals for the purposes of determining the dimension of a workpiece and/or by first checking the plausibility of the three measuring signals prior to drawing on at least two of these measuring signals for the purposes of determining a dimension of a workpiece. Thus, with the aid of the device in accordance with the invention, a process for measuring the geometry of a workpiece can also be effected using just two out of the available total of at least three pressure measuring devices.

Moreover, by the use of three pressure measuring devices in toto, it is possible for a defect in one of the three measuring devices to be detected in a simple manner, for example, by comparing a differential pressure that has been measured by means of the differential pressure measuring device with a difference between the first pressure measurement value and the second pressure measurement value which has been obtained by calculation.

Advantageously, the differential pressure measuring device is connected to the flow channel in fluidic manner both upstream and downstream of the reference nozzle. This makes it possible for a direct and precise measurement of the differential pressure of the test fluid across the reference nozzle to be obtained.

It is preferable that the differential pressure measuring device be configured in the form of a differential pressure sensor. This enables a compact differential pressure measuring device to be produced.

Furthermore, it is preferable for the differential pressure measuring device to be arranged on or in the housing so as to produce a compact device.

In accordance with the invention, the object underlying the invention can also be achieved in the case of a device of the type mentioned hereinabove in that the device comprises a moisture measuring device for measuring the moisture content of the test fluid. In particular, it is preferable for the device to comprise a differential pressure measuring device for measuring the differential pressure of the test fluid across the reference nozzle and a moisture measuring device for measuring the moisture content of the test fluid.

The moisture content of the test fluid affects the viscosity of the test fluid and thus the quantity of test fluid flowing through the flow channel in the device and the pressures of the test fluid prior to and beyond the reference nozzle as seen in the direction of flow. For example, if compressed air is used as the test fluid then the moisture content thereof can vary in dependence on the quality of the process that was used to produce the compressed air. A higher moisture content of a test fluid increases the viscosity, whereby the quantity of test fluid flowing through the flow channel is reduced and the pressures of the test fluid in the flow channel are increased.

With the help of the moisture measuring device, the moisture content of the test fluid can be drawn upon as a further parameter for the determination of the dimension of a workpiece thereby increasing the accuracy of the process for determining such a dimension.

It is expedient if the moisture measuring device has a moisture measuring surface which is connected in fluidic manner to the flow channel. This enables a direct measurement of the moisture content of the test fluid flowing through the flow channel to be made.

Advantageously, the moisture measuring device is configured in the form of a humidity sensor. This makes it possible to produce a compact moisture measuring device.

Furthermore, it is preferable for the moisture measuring device to be arranged on or in the housing. This enables a compact device to be produced.

It is particularly preferable for the device to comprise a temperature measuring device for measuring the temperature of the test fluid. A further parameter for use in the determination of a dimension of a workpiece is thereby made available. This parameter is particularly important since it directly affects the quantity of test fluid flowing through the flow channel, but in addition, it also affects the geometry of the reference nozzle which changes in dependence on the temperature coefficients of the material from which the reference nozzle is made.

It is expedient if the temperature measuring device has a temperature measuring surface which is connected in fluidic manner to the flow channel. This enables a direct measurement of the temperature of the test fluid to be made.

Preferably, the temperature measuring device is configured in the form of a temperature sensor.

Furthermore, it is expedient for the temperature measuring device to be arranged on or in the housing.

In a further preferred embodiment of the invention, an ambient temperature measuring device is provided for measuring the ambient temperature of the device. Such an ambient temperature measuring device enables a further parameter for determining a dimension of a workpiece to be made available. As an alternative or in addition thereto, it is possible to measure the temperature of the device itself, the temperature of a measurement nozzle in the device and/or the temperature of the workpiece. With the help of the ambient temperature measuring device however, it is then at least possible to estimate the temperature of the device, the temperature of a measurement nozzle in the device and/or the temperature of the workpiece if the change of temperature of the environment of the device per unit of time remains within a framework usual for the operational conditions.

In accord with one embodiment of the invention, the ambient temperature measuring device has a temperature measuring surface which is connected in fluidic manner to the environment of the device. This enables a direct measurement of the ambient temperature to be made.

As an alternative or in addition thereto, it is advantageous for the ambient temperature measuring device to have a temperature measuring surface which is in thermal contact with the environment of the device through the intermediary of an intermediate body. Such an intermediate body can, for example, be formed by a housing section of the device which protects the temperature measuring surface from mechanical effects. Moreover, the use of an intermediate body makes it possible for the ambient temperature measuring device to react less sensitively to short term thermal disturbances such as being touched by the operating personnel for example.

Furthermore, it is preferable for the ambient temperature measuring device to be configured in the form of a temperature sensor.

It is expedient, if the ambient temperature measuring device is arranged on or in the housing so as to produce a compact device.

Advantageously, the device comprises an evaluating unit for the purposes of evaluating the signals from at least one measuring device. This evaluating unit can likewise be arranged on or in the housing. As an alternative or in addition thereto, the evaluating unit can also be provided outside the device (externally).

The measuring devices of the device, i.e. the first pressure measuring device and/or the second pressure measuring device and/or the differential pressure measuring device and/or the moisture measuring device and/or the temperature measuring device for measuring the temperature of the test fluid and/or the ambient temperature measuring device for measuring the ambient temperature of the device, can be configured in such a manner as to produce analogue or digital measurement values. Each of these measuring devices can have a unique address associated therewith. The coupling of at least one of the measuring devices to the evaluating unit can be effected by a wired-connection or in wireless manner.

Preferably, the transfer of data between at least one of the measuring devices and the evaluating unit is effected via a bus system.

Advantageously, the device comprises a measurement nozzle through which the test fluid is arranged to flow. When the device is functioning, the test fluid flows firstly through the reference nozzle and then the measurement nozzle. The geometry of the measurement nozzle is adapted to the dimension of a workpiece which is to be determined. For example, a plug gauge can be used for the measurement of an internal diameter of a workpiece whilst a ring gauge can be used for the measurement of an external diameter of a workpiece.

The device in accordance with the invention enables the dimensions of cylinders and pistons and especially those that are intended to be used in injection pumps to be determined to a high degree of accuracy.

The present invention also relates to a method for measuring the geometry of a workpiece, wherein a test fluid is arranged to flow through a reference nozzle located in a flow channel of a housing, wherein a first pressure of the test fluid is measured upstream of the reference nozzle and wherein a second pressure of the test fluid is measured downstream of the reference nozzle, characterized in that, in addition to the first pressure of the test fluid and the second pressure of the test fluid, the differential pressure of the test fluid across the reference nozzle is measured and/or in that the moisture content of the test fluid is measured.

The advantages described hereinabove with respect to the device in accordance with the invention thereby result.

In accord with one advantageous embodiment of the invention, there is determined a deviation between the measured differential pressure of the test fluid and the difference between a first measured pressure of the test fluid and a second measured pressure of the test fluid. The determination of such a deviation enables a check to be made as to whether the measuring devices used for the measurement of the first pressure of the test fluid, the second pressure of the test fluid and the differential pressure of the test fluid are functioning properly and enables plausible measurement values to be detected.

Advantageously, the resultant deviation is compared with a limit value so that in the event that the determined deviation or the absolute value of the determined deviation exceeds the limit value, one is able to deduce that one of the measuring devices is unbalanced or is defective and must be replaced.

Preferably, the limit value is adjustable so as to ensure correct adaptation to the accuracy of measurement that is required for a specific measurement of the geometry of a workpiece.

Furthermore, it is preferable that a quantity of test fluid be determined using the first measured pressure of the test fluid and/or the second measured pressure of the test fluid and that a dimension of the workpiece be determined by using the quantity of test fluid that has been so determined. This method makes it possible to determine a dimension of a workpiece in dependence on a quantity of test fluid which can itself be determined on the basis of at least one pressure of the test fluid, for example, with the help of an allocation function. Thus, a quantity of test fluid emerging from a measurement nozzle can be determined. Since there is a direct relationship between this quantity of test fluid on the one hand and the spacing between a measurement nozzle and an impact surface of a required dimension of a workpiece on the other, such a dimension can be determined to a particularly high degree of accuracy by using the quantity of test fluid.

The accuracy of the measurement can be improved still more if the quantity of test fluid is determined using the measured differential pressure of the test fluid.

The accuracy of the measurement can also be improved by determining the quantity of test fluid using the measured test fluid moisture content of the test fluid.

A further increase in the accuracy of a geometrical measurement of a workpiece can be achieved if the temperature of the test fluid is measured and if the quantity of test fluid is determined using the measured temperature of the test fluid.

As an alternative or in addition thereto, it is advantageous if the ambient temperature is measured and if the dimension of the workpiece is determined using the measured ambient temperature.

Preferably, the quantity of test fluid is referred to a unit of time, for example, to the time interval between two measurements.

Furthermore, the invention relates to the use of the previously described device for measuring the geometry of a workpiece for carrying out the method described hereinabove.

Similar or functionally equivalent elements are designated by the same reference symbols in each of the Figures.

A first embodiment of a device for measuring the geometry of a workpiece is illustrated in FIGS. 1 to 8 and is referenced by 10 therein.

Figure 1:
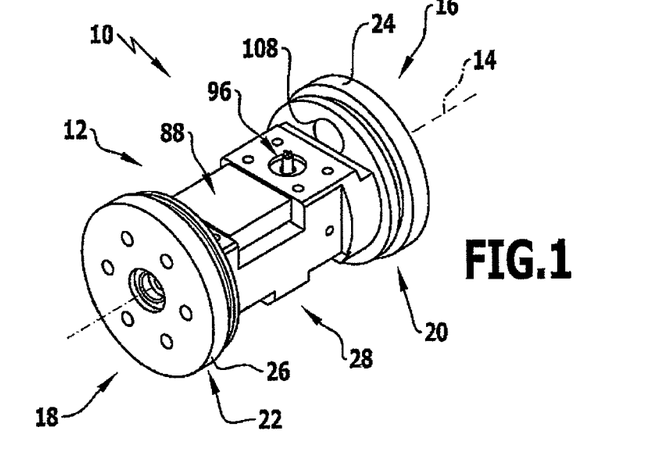
FIG. 1 shows a perspective view of a first embodiment of a device for measuring the geometry of a workpiece.
Figure 2:
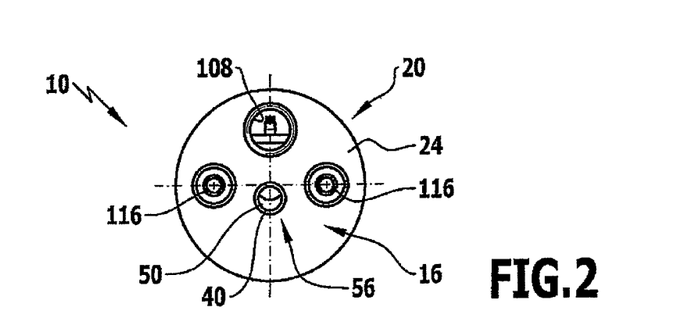
FIG. 2 a front view of the device in accordance with FIG. 1.
Figure 3:
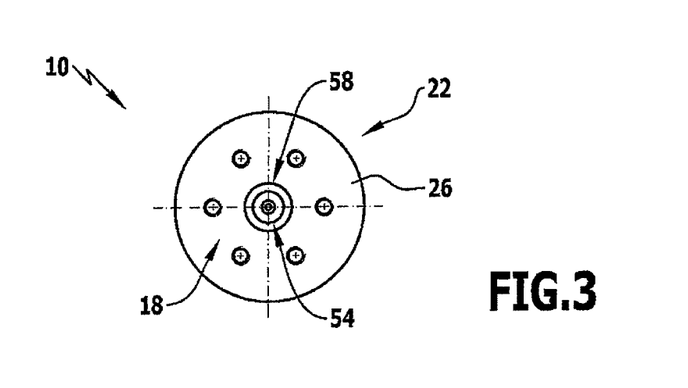
FIG. 3 a rear view of the device in accordance with FIG. 1.
Figure 4:
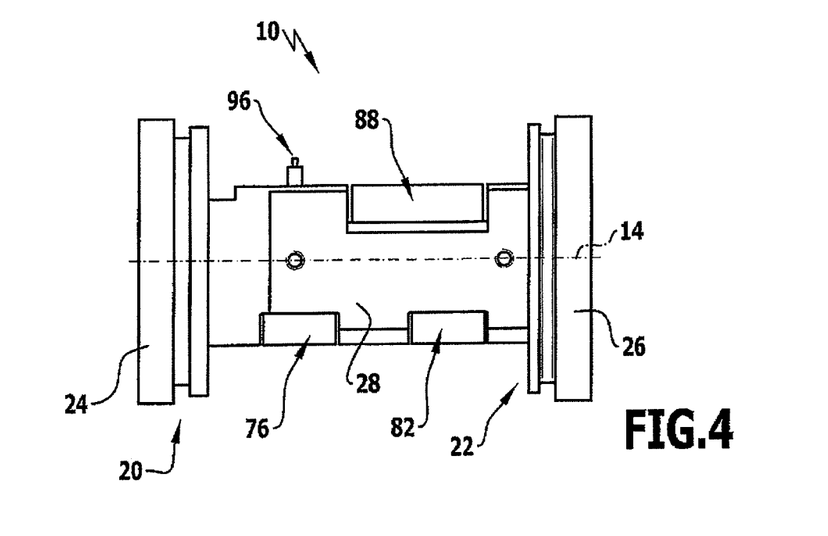
FIG. 4 a first side view of the device in accordance with FIG. 1.
Figure 5:
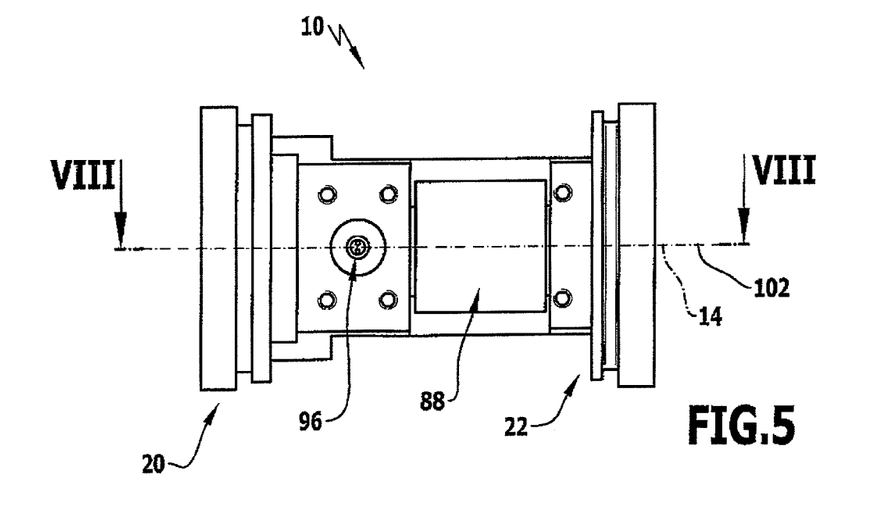
FIG. 5 a plan view of the device in accordance with FIG. 1.
Figure 6:
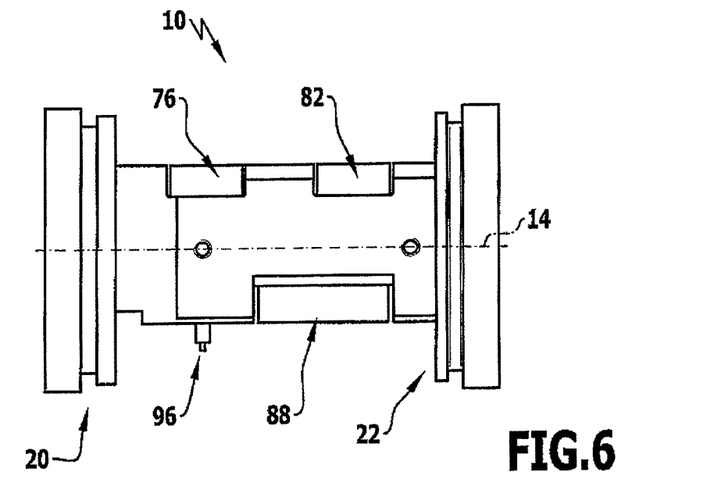
FIG. 6 a second side view of the device in accordance with FIG. 1.
Figure 7:
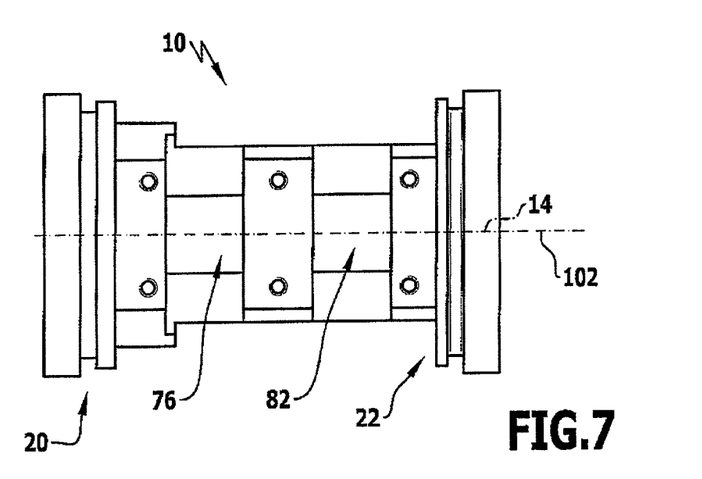
FIG. 7 a view from below of the device in accordance with FIG. 1.

The device 10 comprises a housing 12 which extends along the axis 14 of the housing. The device 10 extends between a front end 16 (c.f. FIG. 2) and a rear end 18 (c.f. FIG. 3) as viewed along the axis 14 of the housing.

The housing 12 comprises a first housing part 20 and a second housing part 22. The first housing part 20 comprises a substantially cylindrical and in particular disk-shaped housing element 24 which forms the front end 16 of the housing 12. The second housing part 22 comprises a substantially cylindrical and in particular disk-shaped housing element 26 which forms the rear end 18 of the housing 12.

Furthermore, the second housing part 22 comprises a central housing element 28. The central housing element 28 and the housing element 26 are formed together in one piece manner. The cross sectional area of the central housing element 28 as viewed transversely relative to the housing axis 14 is smaller than that of the housing elements 24 and 26. A hollow cylindrical housing element 30 is arranged between the housing elements 24 and 26 as is indicated by the dashed lines in FIG. 8. The housing element 30 forms a cylindrical outer wall 32 of the housing 12. The device 10 has an annular intermediary space 34 which, taken with reference to the axis 14 of the housing, is bounded radially outwardly by the housing element 30 and radially inwardly by the central housing element 28.

The device 10 comprises a flow channel 36 which extends between the front end 16 and the rear end 18 of the housing 12. The flow channel 36 extends along a flow channel axis 38 which is preferably in alignment with the central housing axis 14 of the housing 12.

The housing element 24 comprises a first partial section 40 of the flow channel 36 which extends between the front end 16 and the central housing element 28. The first partial section 40 has a partial section axis 42. The second housing part 22 comprises a second partial section 44 of the flow channel 36 and has a partial section axis 46. The partial section axes 42 and 46 are slightly spaced from one another or are in alignment with one another.

The second partial section 44 of the flow channel 36 comprises a distributor area 48 neighbouring the housing element 24 and also a flow channel section 50 which adjoins said distributor area. At the end thereof remote from the distributor area 48, the flow channel section 50 opens into a flow channel section 52. The flow channel section 52 ends in an end section 54 of greater cross-sectional area at the level of the rear end 18 of the housing 12.

The first partial section 40 forms a channel inlet 56 of the flow channel 36; the end section 54 forms a channel outlet 58 of the flow channel 36.

A reference nozzle 60 incorporating a nozzle channel 62 having a nozzle channel axis 64 is arranged in the flow channel 36. The nozzle channel axis 64 is preferably in alignment with the flow channel axis 38 of the flow channel 36.

The reference nozzle 60 has a head part 66 and also a foot part 68 which is formed in one piece manner therewith. The cross section of the head part 66 is greater than that of the foot part 68. The head part 66 is of slightly smaller cross sectional area than the flow channel section 50.

The device 10 comprises a connecting device 70 for connecting the reference nozzle 60 to the housing 12. This connecting device comprises a first connecting section 72 which is arranged on the housing 12 and, in particular, is in the form of an internal thread. Furthermore, the connecting device 70 comprises a second connecting section 74 which is provided on the reference nozzle 60 and is preferably in the form of an external thread.

The device 10 comprises a multiplicity of measuring devices which are connected in fluidic manner to the flow channel 36 and serve for measuring parameters of a test fluid flowing through the flow channel 36.

The device 10 comprises a first pressure measuring device 76 in the form of a first pressure sensor 78. The first pressure sensor 78 is located upstream of the reference nozzle 60 and is connected to the flow channel section 50 of the flow channel 36 in fluidic manner by a conduit 80.

Furthermore, the device 10 comprises a second pressure measuring device 82 in the form of a second pressure sensor 84. The second pressure sensor 84 is connected to the flow channel section 52 of the flow channel 36 in fluidic manner by a conduit 86 downstream of the reference nozzle 60.

Furthermore, the device 10 comprises a differential pressure measuring device 88 in the form of a differential pressure sensor 90. The differential pressure sensor 90 is connected in fluidic manner to the flow channel section 50 by a first conduit 92 upstream of the reference nozzle 60 and is connected in fluidic manner to the flow channel section 52 by a second conduit 94 downstream of the reference nozzle.

Furthermore, the device 10 comprises a temperature measuring device 96 in the form of a temperature sensor 98. The temperature sensor 98 has a temperature measuring surface 100 facing in the direction of the flow channel section 50.

The measuring devices 76, 82, 88 and 96 are arranged within a common first housing plane 102. Preferably, the axis 14 of the housing extends within the housing plane 102. In particular, it is preferable for the first pressure measuring device 76 and the second pressure measuring device 82 to be arranged on the side opposite the differential pressure measuring device 88 taken with respect to the flow channel 36. Furthermore, it is preferable that the temperature measuring device 96 be arranged within the housing plane 102 on the same side as the differential pressure measuring device 88 taken with respect to the flow channel 36.

Figure 8:
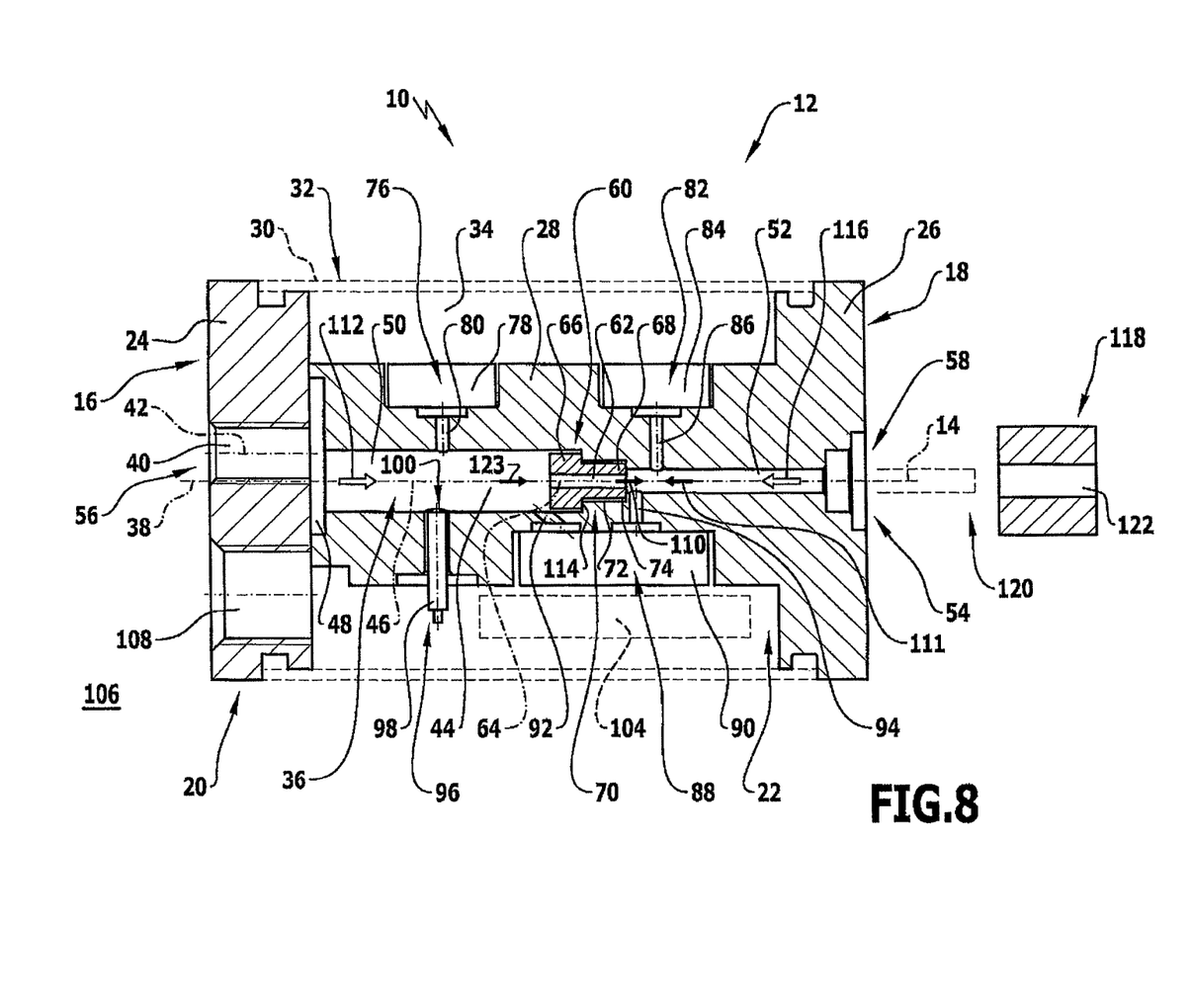
FIG. 8 a view along the line VIII-VIII in FIG. 5 of the device in accordance with FIG. 1 and FIG. 9 a view corresponding to FIG. 8 of a second embodiment of a device for measuring the geometry of a workpiece.

The measuring devices 76, 82, 88 and 96 are connected to an evaluating unit 104 which is indicated in FIG. 8 by dashed lines. The evaluating unit 104 is preferably located in the intermediary space 34 in the housing 12. For reasons of clarity, the data lines which connect the measuring devices 76, 82, 88 and 96 to the evaluating unit 104 are not illustrated in the drawing. The evaluating unit 104 can be connected wirelessly or by wired-connections to further data processing device which are arranged in the area 106 surrounding the device 10 for example. For the purposes of providing a wired connection between the evaluating unit 104 and a further data processing device, the first housing part 20 comprises a cable channel 108 which interconnects the intermediary space 34 of the housing 12 and the surrounding area 106.

As viewed along the nozzle channel axis 64, the cross sectional area of the nozzle channel 62 of the reference nozzle 60 firstly becomes narrower and then widens out again when viewed in a first direction of flow 110 associated with the reference nozzle 60. This direction of flow 110 runs counter to a second direction of flow 111 of the reference nozzle 60. The reference nozzle 60 is preferably a standardized nozzle-jet which is intended for use in a carburetor for example and through which there is a flow of air and/or fuel in the first direction of flow 110 when such use is being made thereof.

In order to produce the device 10, the reference nozzle 60 is inserted into the flow channel section 50 in the second housing part 22 with the foot part 68 thereof first in the direction of assembly 112. The assembly direction 112 and the first direction of flow 110 of the reference nozzle 60 are identical. The reference nozzle 60 is connected to the second housing part 22 with the help of the connecting device 70 by screwing the second connecting section 74 into the first connecting section 72. The second housing part 22 has a stop member 114 for the purposes of positioning the reference nozzle 60 along the housing axis 14. When the reference nozzle 60 and the housing 12 are in their final assembled state, the head part 66 of the reference nozzle 60 abuts the stop member 114.

After the reference nozzle 60 has been mounted in the flow channel 36, the first housing part 20 and the second housing part 22 are connected together with the help of at least one screw-type connection 116 for example (c.f. FIG. 2).

In an alternative embodiment of the device 10 which is not illustrated in the drawing, the cross sectional area of the flow channel section 52 downstream of the reference nozzle 60 is of such a size that the reference nozzle 60 can be added to the housing 12 in a direction of assembly 116 that is opposed to the first direction of flow 110. In the case of this embodiment, it is preferable for the second connecting section 74 of the connecting device 70 that is formed on the reference nozzle 60 to be arranged on the head part 66 of the reference nozzle 60.

The device 10 functions as follows.

In preparation for a measurement to be made on a workpiece 118 (c.f. FIG. 8), a measurement nozzle 120 is connected in fluidic manner to the channel outlet 58 of the flow channel 36. For example, the workpiece 118 has a bore 122 and the diameter thereof needs to be checked. The geometry of the measurement nozzle 120 is adapted to the geometry of the dimension of a workpiece 118 that is to be checked. In preparation for the measurement of the workpiece 118, the measurement nozzle 120 is introduced into the bore 122. Subsequently, a test fluid and in particular compressed air is passed through the flow channel 36. The test fluid flows through the flow channel 36 in the direction of flow of the test fluid 123 which is directed from the channel inlet 56 towards the channel outlet 54 of the flow channel and corresponds to the first direction of flow 110 for the reference nozzle 60. The test fluid enters the first partial section 40 of the flow channel 36 from the channel inlet 56 and then flows on through the distributor area 48, the flow channel section 50, the nozzle channel 62 and the flow channel section 52 to the channel outlet 54, and from there, to the measurement nozzle 120. The measurement nozzle 120 incorporates outlet openings for the test fluid so that the test fluid can emerge from the measurement nozzle 120. The geometry of the measurement nozzle 120 is co-ordinated with the dimension of the workpiece 118 that is to be checked in such a manner as to produce a gap which functions as a flow restrictor in which the test fluid undergoes a loss of pressure.

The reference nozzle 60 works as a further flow restrictor in which a pressure loss likewise occurs. The pressures in the flow channel sections 50 and 52 can be measured by means of the pressure measuring devices 76, 82 and 88 and they are then passed on in the form of pressure measurement values to the evaluating unit 104. Allocation functions that have been determined from measurements made on a reference workpiece are stored in the evaluating unit 104 or in an external data processing device connected to the evaluating unit 104. A workpiece dimension of a workpiece 118 requiring checking can be determined with the help of these allocation functions.

Further parameters which have an effect upon the accuracy of the measurements made on a workpiece 118 can be stored within these allocation functions. These parameters are, for example, the temperature and/or the moisture content of the test fluid and/or the temperature of the area 106 surrounding the device 10. In order to determine what effect the temperature and/or the moisture content of the test fluid and/or the ambient temperature will have on a measurement, reference measurements can be carried out on a reference workpiece. Whilst making these reference measurements, it is preferable that only one of the parameters mentioned above be varied at any one time so that the allocation functions can be supplemented by correcting functions or these correcting functions can be integrated into the allocation functions.

Pressure measurement values associated therewith can be obtained with the help of the pressure measuring devices 76, 82 and 88. It is particularly preferred that at least one pressure measurement value be used in order to determine the quantity of test fluid that flows through the device 10 within a given time interval for example. This quantity of test fluid can be converted into a dimension of a workpiece 118 requiring checking with the help of an allocation function that has been determined by measurements made on a reference workpiece. Preferably, the determination of the quantity of test fluid is additionally effected in dependence on at least one of the parameters, temperature and/or moisture content of the test fluid and/or temperature of the environment 106.

Moreover, the device 10 makes it possible to detect a defect in one of the pressure measuring devices 76, 82 and/or 88. For this purpose, a deviation between the differential pressure measured with the help of the differential pressure measuring device 88 on the one hand and the difference between the first pressure measurement value and the second pressure measurement value on the other can be determined. If the resultant deviation exceeds a predetermined limit value, it can be deduced therefrom that at least one of the pressure measuring devices 76, 82, 88 is defective and that the device 10 must be replaced and/or repaired.

Figure 9:
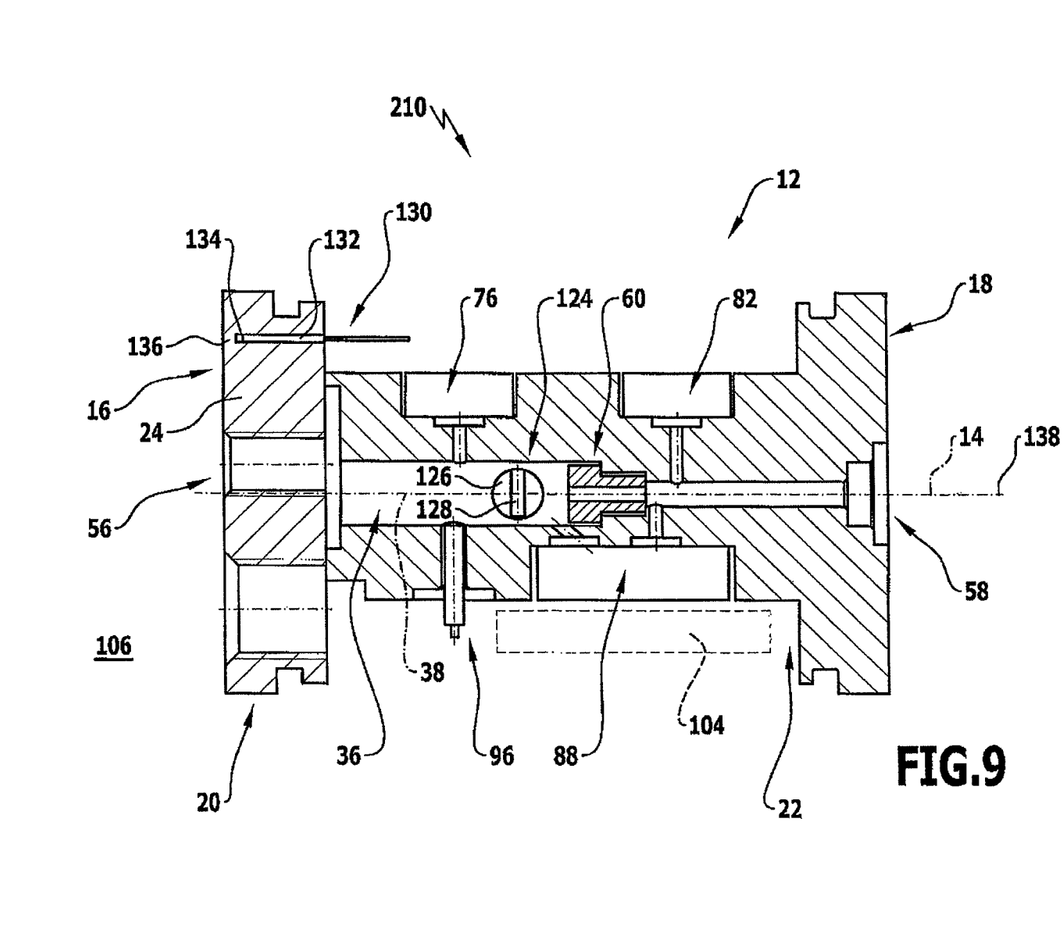

An embodiment of a device for measuring the geometry of a workpiece 118 which bears the reference 210 and is illustrated in FIG. 9 has a similar structure to that of the device 10 for measuring the geometry of a workpiece 118 that has been described above. To this extent then, reference is made to the preceding description in regard to the construction, the production and the manner of functioning of the device 10.

In contrast to the device 10, the device 210 comprises a moisture measuring device 124 in the form of a moisture sensor 126 in addition to the measuring devices 76, 82, 88 and 96. The moisture sensor 126 comprises a moisture measuring surface 128 which is connected in fluidic manner to the flow channel 36 of the device 210. Preferably, the moisture measuring surface 128 is connected in fluidic manner to the flow channel section 50 of the flow channel 36 upstream of the reference nozzle 60.

Furthermore, the device 210 comprises an ambient temperature measuring device 130 in the form of a temperature sensor 132. The temperature sensor 132 is arranged outside the flow channel 36 on or in the first housing part 20 for example. The temperature sensor 132 has a temperature measuring surface 134 facing the front end 16 of the device 210. Arranged between the temperature measuring surface 134 and the front end 16 of the device 210, there is an intermediate body 136 by means of which the temperature measuring surface 134 and the environment 106 of the device 210 are placed in thermal contact with one another. The intermediate body 136 is preferably formed by a material section of the housing 12 and in particular by a material section of the housing element 24.

The moisture measuring device 124 is arranged in a second housing plane 138. The second housing plane 138 is perpendicular or substantially perpendicular to the sectional plane illustrated in FIG. 9 which corresponds to the first housing plane 102 of the device 10.

In an alternative embodiment of a device 210 which is not illustrated in the drawing, the temperature measuring device 96 for the measurement of the temperature of a test fluid flowing through the flow channel 36 is likewise arranged within the second housing plane 138. Preferably thereby, the temperature measuring device 96 and the moisture measuring device 124 are arranged on mutually opposite sides taken with reference to the flow channel 36.

With the help of the moisture measuring device 124 and with the help of the ambient temperature measuring device 130, there are now available two further parameters which can be drawn upon for the measurement of a workpiece 118. The influence of these parameters can be determined from measurements that are made on reference workpieces, stored in allocation functions and taken into account when taking the measurements of a workpiece 118 requiring checking.

The devices 10, 210 enable the geometry of a workpiece 118 to be measured in a particularly precise manner. Particularly precise measurements of the geometry of a workpiece 118 are possible due to the correct installation position of the reference nozzle 60, the substantially straight-line extent of the flow channel 36 as well as the multiplicity of measurement values that are available. Additionally, a diagnostic function for checking the proper functioning of the pressure measuring devices 76, 82, 88 can be realized.

The invention claimed is:

1. A method for measuring the geometry of a workpiece, wherein a test fluid is arranged to flow through a reference nozzle located in a flow channel of a housing, wherein a first pressure of the test fluid is measured upstream of the reference nozzle and wherein a second pressure of the test fluid is measured downstream of the reference nozzle, wherein, in addition to the first pressure of the test fluid and the second pressure of the test fluid, the differential pressure of the test fluid across the reference nozzle is measured and/or in that the moisture content of the test fluid is measured, wherein there is determined a deviation between a measured differential pressure of the test fluid and the difference between a first measured pressure of the test fluid and a second measured pressure of the test fluid.

2. A method in accordance with claim 1, wherein the deviation is compared with a limit value.

3. A method in accordance with claim 2, wherein the limit value is adjustable.

4. A method in accordance with claim 1, wherein a quantity of test fluid is determined using the first measured pressure of the test fluid and/or the second measured pressure of the test fluid and in that a dimension of the workpiece is determined using the thus determined quantity of test fluid.

5. A method in accordance with claim 4, wherein the quantity of test fluid is determined using the measured moisture content of the test fluid.

6. A method in accordance with claim 4, wherein the temperature of the test fluid is measured and in that the quantity of test fluid is determined using the measured temperature of the test fluid.

7. A method accordance with claim 4, wherein an ambient temperature is measured and in that the dimension of the workpiece is determined using the measured ambient temperature.

* * * * *